United States Patent [19]

Censier et al.

[11] 4,012,717
[45] Mar. 15, 1977

[54] BI-PROCESSOR DATA HANDLING SYSTEM INCLUDING AUTOMATIC CONTROL OF EXCHANGES WITH EXTERNAL EQUIPMENT AND AUTOMATICALLY ACTIVATED MAINTENANCE OPERATION

[75] Inventors: Lucien Censier, Conflans; Alice Maria Recoque, Chatenet Malabry, both of France

[73] Assignee: Compagnie Internationale pour l'Informatique, Louveciennes, France

[22] Filed: Apr. 23, 1973

[21] Appl. No.: 353,424

[30] Foreign Application Priority Data

Apr. 24, 1972 France .................. 72.14418

[52] U.S. Cl. .................. 340/172.5; 235/153 AE
[51] Int. Cl.[2] .................. G06F 11/00; G06F 15/16; G06F 15/46
[58] Field of Search .......... 340/172.5; 235/153 AE; 444/1

[56] References Cited

UNITED STATES PATENTS

| | | | |
|---|---|---|---|
| 3,303,474 | 2/1967 | Moore et al. | 340/172.5 |
| 3,409,877 | 11/1968 | Alterman et al. | 340/172.5 |
| 3,444,528 | 5/1969 | Lovell et al. | 235/153 AE |
| 3,471,686 | 10/1969 | Connell | 235/153 AE |
| 3,517,171 | 6/1970 | Avizienis | 340/172.5 |
| 3,517,174 | 6/1970 | Ossfeldt | 235/153 AE |
| 3,544,777 | 12/1970 | Winkler et al. | 235/153 AE |
| 3,623,011 | 11/1971 | Baynard, Jr. et al. | 340/172.5 |
| 3,770,948 | 11/1973 | Caputo et al. | 235/153 AE |

*Primary Examiner*—Gareth D. Shaw
*Assistant Examiner*—John P. Vandenburg
*Attorney, Agent, or Firm*—Kemon, Palmer & Estabrook

[57] ABSTRACT

Two microprogrammed processors of identical hardware and software facilities are synchronously operated for exchange operations with a plurality of external store and peripheral units. The exchange connections from the processors to the external units pass through gate circuits one of which only is operative at a time. Each processor has an output at which all processed words, whether instructions, microinstructions, operands or results are successively available. Comparator means permanently compare such words from the two processors and, when a mismatch occurs, block the processors and, their own comparison outputs and gate circuits and control execution in both processors of a failure detection and check up routine. Each processor includes exchange control claiming and exchange control disclaiming outputs. When a processor activates its exchange control disclaiming output, its gate means are blocked, the output of the comparator means is inhibited and the other processor is automatically qualified to proceed with the exchanges. Casually, the processors are then desynchronized.

7 Claims, 1 Drawing Figure

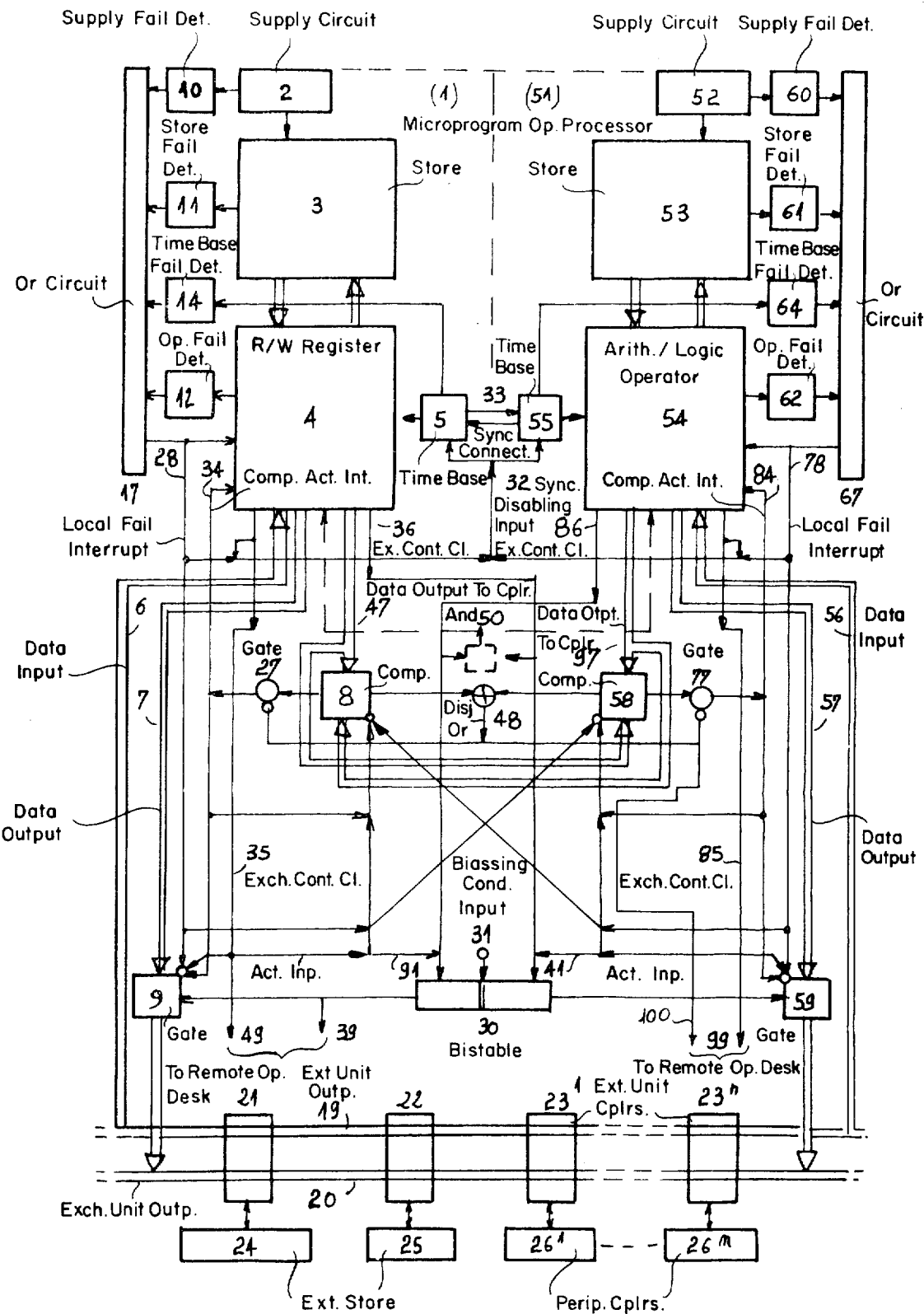

BI-PROCESSOR DATA HANDLING SYSTEM INCLUDING AUTOMATIC CONTROL OF EXCHANGES WITH EXTERNAL EQUIPMENT AND AUTOMATICALLY ACTIVATED MAINTENANCE OPERATION

BRIEF SUMMARY OF THE INVENTION:-

The present invention concerns improvements in or relating to data processing systems wherein a central unit operates on data from external store and peripheral units on a microprogrammation basis. Such a central unit consequently comprises microinstruction rountine store for decomposition of instruction words from an external store, operand processing store and arithmetic/logic operator circuit having appropriate test and check circuits activated on occurrence of software and hardware failures in the central unit. Exchanges with the external units may pass through the conventional read-write register of the operand processing store, which is associated to the said arithmetic/logic operator circuit in such a respect.

Early detection of failures in such a system is of utmost importance, i.e. it is necessary to obtain knowledge of such failures as soon as they occur. Redundant or majority responsive logics, when used, are not sufficient for preventing failures. The use of two distinct processors simultaneously operative in a central unit has been contemplated but had not proved efficient up to now as it had been provided to compare only the final results of a same task executed by both processors and the comparison facilities were limited to programmed connections grouped on a single interruption basis. In such conditions, it was not possible to have an indication of a mismatch between the independantly obtained results in less than, for instance, two hundreds microseconds, a delay presently not compatible with the normally ensured speeds of computation of such systems.

It is an object of the present invention to provide a data processing system, the central unit of which comprises two identical microprogrammed processors, adapted for early detection of failures, quick identification of the one of said processors subjected to such a failure and, when possible, adapted to immediate continuation execution of a task by the one of the processors which is still operative.

Each of the microprogrammed processors is of the type disclosed in RECOQUE U.S. Pat. No. 3,768,076, wherein it is clearly disclosed that a readwrite register U, associated with the arithmetic/logical unit, or operator, OP, is such that all data words successively appear in said register and are consequently directly available at such a unique (single) point of the processor. Said words include instructions, microinstructions, operands and results, as well as data words from or to the external equipment such as the Central store (MC) of Recoque, and from or to the peripheral equipments Po to Pn through coupling circuits Co to Cn.

According to the invention, a data processing system comprises two microprogrammed processors of identical hardware and software facilities and identically coupled to a plurality of external store and peripheral units, which processors are normally synchronized for simultaneous execution of a task, said processors have outputs at which the processed data, including instructions, microinstructions, operands and results are available and comparator means permanently check the matching conditions of such data. Each processor is provided with gate means in its outputting connection to the external units and, when a mismatch is detected by said comparator means, said gate means are blocked and a failure check up routine initiated in each one of the processors.

The said gate means are normally controlled in reverse conditions of conduction and, at the end of such a failure check routine, decision automatically occurs as to the conditions to impart to such gate means for continuation of the task which has been interrupted in both processors. The comparator means however will have their output inhibited during such a continuation of a task, not to produce erroneous interrupts.

BRIEF DESCRIPTION OF THE DRAWINGS:

The invention will be now fully described with reference to the single FIG. of the accompanying drawings which shows an example of a system from which any variation may be directly deduced.

DETAILED DESCRIPTION:-

In this figure, the two processors are shown at 1 and 51. They are of identical hardware and software and their exchanges are with a plurality of external units such as 24, 25 and 26' to 26". The processor 1 comprises a supply circuit 2, a store 3 comprising as well microinstruction routines as operands and task executive registers, a time base circuit 5 which must be understood as including a clock, an arithmetic/logic operator 4 comprising registers, accumulators and the usual word configuration checking circuits, a plain connection 6 for receiving data from the external units and a connection 7 comprising gate means 9 for transmitting data to the external units, plus a comparator 8 which receives through a connection 47 from the operator 4 all the data successively passing in said operator during the execution of a task:- instructions from the external store units, operands from the external units, local store addresses and external store and peripheral unit addresses, and so on. All such data are, as commonly known, available in a microprogrammed processor, at their respective time of occurrence, at such a location as the read-write register of the store 3 which is associated to the operator 4 through bus leads. Through an identical output from the processor 51, the comparator 8 receives the similar data in said processor. The processor 51 comprises the same basic components, of numerical references increased by fifty. The comparator 58 of said processor is fed with the data available from 97 and those from the output 47 of processor 1. The time base circuits of the processors are, in normal and simultaneous operation, mutually synchronized from connections 33. Said synchronization is for instance ensured at the levels of the clocks in said time base circuits. When synchronized the processors must issue at 47 and 97 permanently matching data of identical time instant occurrences. Both comparators 8 and 58 are arranged for activating their respective outputs on detection of mismatch condition of their inputs.

In the external units, 24 and 25 are for instance and illustratively, instruction stores and/or consoles, and units 26' to 26" are peripheral units such as disks, drums, tapes and so forth. As conventional, the external units are each provided with a coupling unit to the central unit and said coupling units, 21 to 23", not to be described per themselves, present omnibus (bus for short) leads 19, to the central unit, and 20, from the central unit.

The gate means 9 and 59 always operate in reverse conditions of conduction. When 9 is unblocked, 59 is blocked and viceversa, according to the own condition of a two-condition bistable member 30. Said member is shown as a bistable circuit having two actuation inputs 41 and 91. In the shown example, when 41 is activated, the circuit 30 controls 9 to unblocking, i.e. the processor 1 is habilitated to send the informations through 9 to the external units. When 91 is activated, the condition is reversed and it is the processor 51 which is habilitated to send the informations to the external units.

An output 36 of the processor 1 is activaed when said processor claims the control of the exchanges to the external units, said output 36 being connected to the input 41 of the bistable circuit 30. Another output 35 of said processor 1 is connected to the input 91 of the bistable circuits 30 and positively disclaims the control of the exchanges to the external units when activated. Similarly, an output 86 of the processor 51 is activated for claiming the control of the exchanges to the external units being connected to the input 91 of 30, and a control disclaiming output 85 connected to the input 41 of 30. When the two processors are simultaneously active, the condition of 30 must be the result of a choice rather than a random one (which is yet a possible "choice"). Either a bias is applied to the bistable member 30, for instance at 31, for giving a preferred conditions when no pulse signal is applied at 41 or 91, or the condition is the result of a micro-program execution at the beginning of a task, said microprogram selecting the processor the output 36 of which must be pulse activated for setting the bistable member 30 or the processor the output 86 of which will set said member, the other output being "masked", i. e. inactivated at the end of such a micro-program. 39 is a signalling line to a remote monitoring set of the condition of the member 30. 49 and 99 are signalling lines for disclaims of exchange control from the processors to such a remote monitoring set, not shown as no part of the invention.

Each one of the processors is provided with circuits for detecting internal failures. Such circuits are shown at 11 and 12, respectively associated to the store 3 and the operator 4 of processor 1, the corresponding circuits being shown at 61 and 62, respectively associated to the store 53 and the operator 54 of processor 51. Such circuits are conventional. Further, to each one of the supply circuits 2 and 52 are associated failure detecting circuits, 10 respectively 60, and to each one of the time base circuits 5 and 55 are associated failure detecting circuits, 14 respectively 64. the outputs of the failure detecting circuits 10 to 12 and 14 are applied to an or-circuit 17. The outputs of the failure detecting circuits 60 to 62 and 64 are applied to an or-circuit 67. The output of 17 is connected to an input 28 of processor 1 and the activation of said input will produce in said processor an interrupt process and the execution of a failure identification microprogram. The output of 67 is similarly connected to an input 78 of the processor 51 having the same function as the output 28 in processor 1.

Each one of the processors may further comprises special circuits for the detection of programmation mistakes and failures of the external units and the coupling units thereof. Such circuits will obviously operate simultaneusly for interrupting the operation of the whole system and consequently, as being outside the scope of the invention, they do not need any further mention.

On the other hand, the occurence of a failure detected by one of the circuits of a processor reacts on the system of the invention. The activation of 28 interrupts the normal operation of 1 and the activation of 78 interrupts the normal operation of 51. Consequently, when such a condition occurs:- (1°) the outputs of both comparators 8 and 58 must be inhibited, which is ensured by the connections from the outputs 28 and 78 to inhibiting inputs of both comparators, (2°) when 28 is activated, gate means 9 must be inhibited and an actuation signal applied to the input 91 of the two-condition member 30, as ensured by shown connections, (3°) when 78 is activated, gate means 59 must be inhibited and an actuation signal applied to the input 41 of the two-condition member 30, as ensured by shown connections, (4°) preferably, the synchronization of the time bases 5 and 55 must be ensured and, in this respect, the outputs 28 and 78 are shown in logical or-combination applied to a synchronization inhibiting input 32 of said circuits 5 and 55.

The mismatch output of the comparator 8 passes through a gate 27 prior reaching an input 34 of the processor 1 which, when activated, will interrupt the execution of the task in said processor and initiates a check up routine for deciding if it is this processor which is generating the detected mismatch. The mismatch output of the comparator 58 also passes through a gate 77 prior reaching an input 84 of the processor 51 which, when activated will interrupt the execution of the task in said processor and initiates a chek up routine for deciding if it is this processor which is generating the detected mismatch. Normally, both comparators 8 and 58 will simultaneously detect and signal such a mismatch. The activation of 34 inhibits the gate means 9 and the comparator means 8. The activation of 84 inhibits the gate means 59 and the comparator means 58. No rupture of synchronization is useful at this step of operation of the system since the check up routine is the same for both processors. Further, the comparators 8 and 58 are provided with outputs applied to a disjonctive-or circut 48, a circuit the output of which will be activated when the said outputs will relatively mismatch and will block (inhibit) the gates 27 and 77. When a relative mismatch between the outputs of the comparators occurs, as obvious, one of the comparators is the subject of a failure and the condition of its output must not control any interrupt, which is ensured by such a circuit arrangement. The comparator means are placed in an "off" operation condition but without any interference with the execution of the task. A comparator failure may be signalled, as shown by the signalling line 100 from the output of 48, to a remote operator's desk when required. It would be quite possible to provide the system with a single comparator, as apparent, but a failure of such a single comparator would be lengthy to detect (repeated and random interrupts) so it is estimated preferable though more costly to provide such a pair of comparators as shown. When a single comparator is provided, however, it will then be preferable to make it in majority logics circuitry.

As already described, the data which are available at the outputs 47 and 97 of the processors, to be applied to the comparator means, not only include the results of execution of microinstructions but all address, operands and instruction and microinstruction codes during a task of the processors. Consequently, in such an organization of the system as herein above described, a very early detection of failure will be ensured. If, further, some of the circuits such as 10 to 12 and 14 or 60 to 62 and 64 itself fails, the detection of the failure in the processor which it normally ensures, will be, just later, be detected by the comparator means proper.

As already described too, when both comparators issue a mismatch signal, a check up routine is initiated in each processor, said check up routine beginning by a task interrupt microprogram for preserving the context of the interrupted task and continuing by a systematic check up of all the functional components of the processors. Normally, at the end of such a check up routine, one of the processors must have already activated its control disclaiming output, 35 for 1 or 85 for 51, thus controlling inhibition of the synchronization in the time bases 5 and 55 and inhibition of the comparator means (more definitely continuation of such an inhibition of the comparator means); when 35 is activated, it further inhibits the gate means 9 and applies to the input 91 of the two condition member 30 a signal requesting the switching of the condition of said member, if necessary for giving the exchange control to the other processor; when 85 is activated, it also inhibits the gate means 59 and applies to the input 41 of 30 a signal requesting the switching of said member to a condition giving the exchange control to processor 1.

Thereafter, normally, the other processor must activates its exchange control claiming output, 36 for 1, 86 for 51, and the execution of the executed task is reinstated and ensured by the said processor.

Though of doubtful possibility, it may be that, once the check up routines executed, both processors still claim the control of exchanges with the peripheral and external store units. A more elaborated program of test must be requested and executed for deciding which processor is actually the subject of a failure. This may be ensured as follows:- an AND-circuit 50 is connected across the outputs 36 and 86 of the processors and it must be understood that said AND-circuit is only unblocked from the acquit instruction of a chek up routine and is normally inoperative, or is unblocked from the simultaneous activation of the inputs 34 and 84 of the comparators:- for instance, 50 may include a bistable member set to work at simultaneous activations of 34 and 84, or of 36 and 86, reset to rest when one of such activations disappers. The output of 50 is connected to respective test program inputs of the processors, and consequently such a program of test is requested each time the AND-circuit 50 activates its output. It may be noted that such a program of test may have recourse to an external unit since the connections 6 and 56 from the external units to the processors are never blocked and one at least of the gate means 9 and 59 is unblocked (or else, the request of such a program from an external unit may be directly provided by the activation of the output of 50). Such a program will check the processors for execution of typical instructions and, normally again, one of the processors must have activated its control disclaiming output before the last instruction of said programme. In the utmost improbable case such a program could not obtain such a result, the task will be continued with "random" attribution of the exchange control to one of the processors as herein above explained for defining the initial condition of the two-condition member 30.

As apparent, once the comparators inhibited, they remain inhibited until the interrupted task is completed and, for complete security in this respect, each inhibiting input of the comparators may be made a memory preserving one (a more bistable member actuated from activation of such an inhibiting input will suffice in this respect).

What is claimed is:

1. A data processing system comprising the combination of two microprogram operated processors of identical hardware and software facilities and identical coupling connections to a plurality of external store and peripheral units, gate means in each of the connections outputting from the processors to said external units, two-condition circuit means for controlling said gate means in reverse conditions of conduction, means synchronizing the operations of the processors during execution of a task, outputs in said processors at which the processed data are simultaneously available in their sequence of occurrence, comparator means having inputs connected to said processor outputs and an output responsive to a mismatch between the inputting data thereof connected to inhibiting inputs of the said gate means and to respective interrupt inputs of the processors initiating simultaneous check up routine therein and further outputs of the processors to the said two-condition circuit means individually responsive to the result of the completion of such a check up routine in each processor for controlling the said two-condition circuit means and masking the output of the said comparator means for the completion of the interrupted task after completion of the said routine.

2. A data processing system according to claim 1, wherein each processor further comprises local failure detecting circuitry and a task interrupt terminal responsive to the activation of said circuitry for disabling said synchronizing means and said comparator means and controlling the condition of the said two-condition circuit means for blocking the gate means of the processor wherein a failure identification routine is initiated.

3. A data processing system comprising a central unit, a plurality of external store and peripheral units, a common inputting channel from said external units to said central unit and a common outputting channel from said central unit to said external units, wherein:

said central unit comprises first and second simultaneously operating, time-base synchronized microprogrammed processors of identical hardware and software organizations, each processor having a data output connection to the said common outputting channel through data transfer gate means, each processor further having a bus output on which all the codes of the words involved in the execution of any task successively appear, each processor further having a first task interrupt input the activation of which initiates a checkup routine in the processor, and first and second checkup result responsive outputs, one of which is activated for a positive result of the checkup and the other of which is activated for a negative result of the checkup, a two-condition member having distinct actuation inputs and a pair of complementary condition outputs respectively controlling in reciprocal transfer conditions the data transfer gate means of said first and second processors, one of the said actuation inputs being connected to the first checkup responsive output of the first processor and to the second checkup responsive output of the second processor and the other one of the said actuation inputs being connected to the second checkup responsive output of the first processor and to the first checkup responsive output of the second processor, and, code comparator means having respective inputs connected to the bus outputs of the first and second processors and a mismatch output connected to both the said first task interrupt inputs of the processors, to inhibiting inputs of both the said data transfer gates and to a code comparator means self-inhibiting input.

4. A data processing system according to claim 3, wherein said code comparator means comprise first and second code comparator circuits each having inputs connected to the bus outputs of the processors, each having its output connected to its own self-inhibiting input through a gate connection, the first code comparator circuit having said gated output connected to the first task interrupt input of the first processor and to the inhibiting input of the data transfer gate means of said first processor, the second code comparator circuit having its gated output connected to the first task interrupt input of the second processor and to the inhibiting input of the data transfer gate of said second processor, and wherein said first and second code comparator circuits have outputs connected to respective inputs of an exclusive-OR circuit the output of which is connected to inhibit inputs of the said gated outputs on the occurrence of a mismatch condition between the inputs of the said exclusive-OR circuit.

5. A data processing system according to claim 3, wherein each of the said first and second processors includes a local failure detecting orgaination, the output of which is connected to a second task interrupt input the activation of which initiates a failure localization routine in the processor, said second task interrupt input being connected to an inhibit input of the data transfer means of said processor, to the inhibit input of the said code comparator means and to the actuation input of the said two-condition member which is connected to the second checkup responsive output of the processor.

6. A data processing system according to claim 5, wherein both second checkup responsive outputs and both second task interrupt inputs of the processors are further connected to a time-base synchronizing inhibiting input of the time bases of the processors.

7. A data processing system according to claim 3, wherein a diagnostic routine control circuit is connected across the said first checkup responsive outputs of the processors and has its output connected to diagnostic routine initiating inputs of the said processors.

* * * * *